United States Patent Office 2,734,525
Patented Feb. 14, 1956

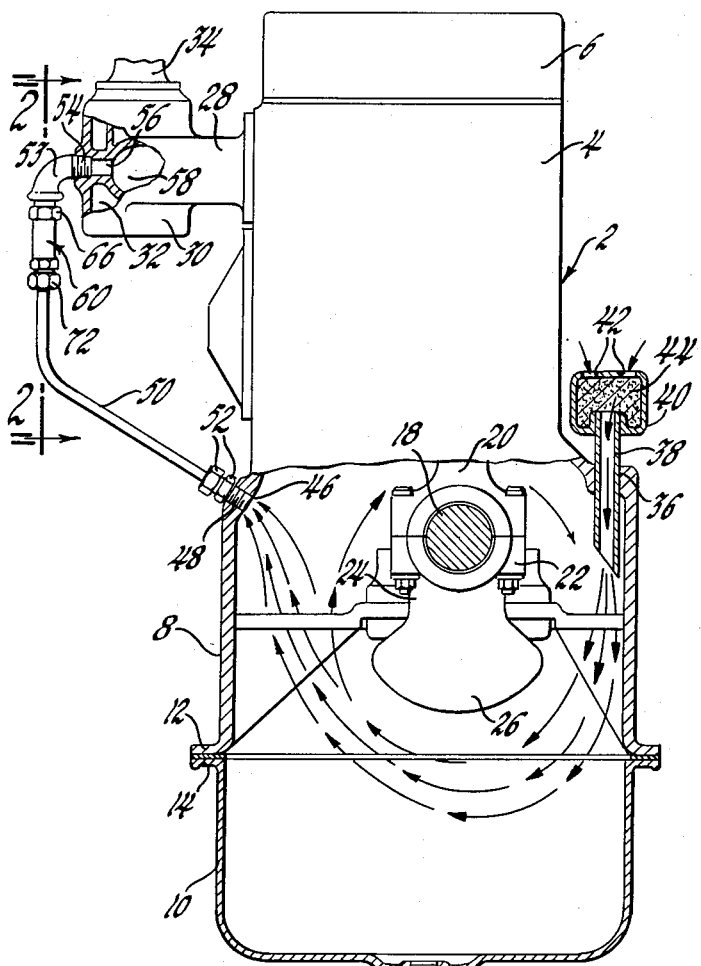

2,734,525

AIR FLOW CONTROL MEANS

John T. Rausch, Berkley, Mich., assignor to General Motors Corporation, Detroit, Mich., a corporation of Delaware Application December 29, 1954, Serial No. 478,434

8 Claims. (Cl. 137—480)

This invention relates to air flow control means in general and more particularly to crankcase ventilation control means and manifold vacuum control means as adapted for use within an internal combustion engine.

Crankcase ventilation is necessary in internal combustion engines to prevent water and other vapors from collecting within the engine crankcase and from having vapor condensate formed within the oil pan where it will adversely effect the engine lubricating system. Such ventilating means sometimes include a breather conduit extended between the top of the engine crankcase and the engine intake manifold to allow manifold suction to draw off deleterious vapors from the crankcase and pass them through the engine and out the engine exhaust system.

Since engine intake manifold suction varies under different engine load conditions, flow control means are generally disposed within the crankcase breather conduit. Such control means are adapted to assure a minimal restriction to air flow through the breather conduit during conditions of low manifold vacuum, when reduced suction is available, and proportionately greater restriction as the manifold vacuum pressure increases. At high manifold vacuum conditions it has generally been considered advisable to reduce the suction applied to the crankcase to the minimum which will allow sufficient ventilation and yet will not allow dilution of the combustible charge being fed to the engine. An air flow control valve, of this type, as adapted for crankcase ventilation is shown by Patent 2,423,592 to Foster, issued July 8, 1947.

It has been found that during a condition of engine overrun, when the engine is operating at high speeds and the throttle valve is closed, the intake manifold vacuum is such as will cause lubricating oils to be drawn through valve shaft passages and past piston rings and to reach the combustion chamber of the engine. This aspect of high manifold suction therefore results in high oil consumption.

It is now proposed to greatly reduce oil consumption within an engine during overrun condition by providing a means for preventing the extremely high manifold vacuums which cause such consumption. It is proposed to provide means allowing for the usual control of crankcase ventilation during low manifold suction as well as during higher manifold vacuum pressures, including the restriction of air flow to the intake manifold during a high manifold vacuum condition to prevent dilution of the combustible charge, and which means will also prevent excessive manifold vacuum pressures which will cause increased oil consumption. It is further proposed to provide manifold vacuum control means in combination with crankcase ventilation control means and to dispose such control means within the crankcase ventilation system. It is still further proposed to provide means for employing the crankcase ventilation air for reducing the higher manifold vacuum pressures within tolerable limits.

The proposed manifold vacuum and crankcase ventilation control means is compact in size, includes a minimum of separate parts, simply arranged, and is inexpensive to manufacture, easy to install and highly effective in operation.

In the drawings:

Figure 1 is an end view of an engine having parts broken away and shown in section to better disclose the invention.

Figure 2 is a cross-sectional view of the proposed flow control valve as shown in the plane of line 2—2 of Figure 1 looking in the direction of the arrows thereon.

Figure 3 is a cross-sectional end view of the proposed flow control valve as taken in the plane of line 3—3 of Figure 2 looking in the direction of the arrows thereon.

In Figure 1 there is shown an internal combustion engine 2 having a cylinder block 4, cylinder head 6, crankcase 8 and oil pan 10. The crankcase 8 and oil pan 10 are connected by flanges 12 and 14, respectively, by conventional means. The oil pan is provided with a drain plug 16.

A crankshaft 18 is mounted within the engine and has connected thereto connecting rods 20 secured to the crankshaft by caps 22. The crankshaft includes the usual crankthrows 24 and counterweights 26.

The intake manifold 28 of the engine includes the heating device 30 at its mid-section which is adapted to receive exhaust gases for circulation within the space indicated at 32. A riser 34 is connected to the intake manifold and is adapted to receive a downdraft carburetor, not here shown, in the usual manner.

The crankcase 8 has an opening 36 formed through one side thereof with an air inlet tube 38 extended therethrough. The inlet tube 38 includes a cover 40 mounted on the upper end thereof and having opening 42 formed therethrough to allow for the entrance of air. Filter material 44 is disposed within the cover 40 to provide for the filtering of air before it reaches the crankcase.

A second opening 46 is provided through the opposite side of the crankcase 8 and is adapted to receive one end of a conduit or tube 50 which is secured therein by screw threads 48 and fastening means 52.

The other end of tube 50, as indicated by the adapter 53, is screw threaded as at 54 within a passage 56 formed through the heater section 30 of the intake manifold. Passage 56 communicates directly with the interior 58 of the manifold.

A flow control member or means 60 is connected within the tube 50 intermediate its ends and is adapted to regulate the flow of air and entrained vapors and gases from the crankcase 8 to the manifold 28. The manner in which air enters the crankcase through the inlet tube 38, swirls through the crankcase and then passes through the breather tube 50 into the manifold 28, as indicated by the arrows shown in Figure 1.

The flow control valve 60 includes an outer shell or housing 62 externally threaded near one end thereof, as at 64, and secured within a coupling member 66. The coupling member 66 is itself screw threaded as at 68 and secured within the adapter 53. The other end of the housing shell 62 is threaded as at 70 and secured by a nut 72 to the end of the tube 50. The housing 62 and coupling 66 are bored out to provide passages 74 and 76, respectively, therethrough.

Within the housing shell 62 is disposed an external valve member 78 which includes a tubular body portion 80 having an annular member 82 threaded, as at 84, and received within the lower end thereof. A passageway 86 is provided through the annular member 82 and a chamber 88 and passage 90, in communication therewith, is provided through the valve body portion 80. The passages 86 and 90 and chamber 88 allow the flow of air from tube 50 through the external valve member 78.

The lower end of the housing 62 is formed to provide a valve seat 92 upon which is received the conically chamfered end 94 of the external valve member 78. The external valve member 78 is held upon the valve seat 92 by a calibrated helical spring 96 disposed within the upper portion of passage 74 and engaged between the end of the housing 62, formed by shoulder 98 of coupling member 66, and the end 100 of the valve member. The sides of the external valve member 78 are fluted or formed with circumferentially spaced grooves 101 which communicate with the open upper portion of passage 74.

Within the chamber 88 of the external valve member 78 is disposed an internal valve member 102. The internal valve member 102 includes a flange 104 formed about its lower end and adapted to be received upon the shoulder 106 formed by the annular member 82 threaded within the end of the body portion 80 of valve member 74. The innermost lower surface of flange 104 is recessed slightly as at 108 and spaced apart from the shoulder 106 of member 82 and has only the outer circumferential portion seated thereon.

The other end of the internal valve member 102 is conical in shape, as shown by numeral 110, and is centered beneath passage 90 of valve member 78. The end 100 of valve member 78 is formed to provide a valve seat 112 within which valve member 102 is received. A calibrated helical spring member 114 disposed within the chamber 88 and about the valve member 102 is adapted to bias the valve member 102 in an open position by being compressed between the end 100 of valve member 78 and the flange 104 of valve member 102. A bead 116 formed about the valve 102 just above the flange 104 assists in retaining the spring 114 in engagement with the flange.

Passages 118 and 120 are formed through the internal valve 102 in communication with the other passages 74, 76, 86 and 90. Openings 122 are also provided through the side walls of valve 102 intermediate the ends thereof for communication with chamber 88. A pin 124 with a head 126 is disposed within valve 102 with the stem of the pin extended through the passage 120 and the head disposed within the vicinity of openings 122 through the sides of the valve. The pin 124 is allowed sufficient freedom of movement to prevent the lodging of foreign matter within openings 122 but not such as will allow its accidental removal.

The internal valve 102 is adapted to control crankcase ventilation and operates in the following manner. Crankcase air is drawn through tube 50 and is received through passages 86 and 118 to within the internal valve 102. The air then passes through passage 120 and openings 122, through chamber 88 and passage 90, and through the upper portion of passage 74 and on into the interior 58 of the manifold.

As the manifold depression increases more air is drawn through the conduit 50 causing a greater force to be applied against the lower end of the internal valve 102 and to build up between the end 108 of the valve and the shoulder or seat 106 to lift the valve against the biasing action of the spring member 114 until eventually the end 110 of the valve is engaged with the valve seat 112.

The force of the air flow through the breather tube 50 is such that it will not begin to effect or overcome the spring 114 until a pressure differential, of say about three inches of mercury, exists between the atmospheric condition within the crankcase and the pressure condition within the intake manifold. When the pressure differential exceeds the prescribed limits the air flow is sufficiently strong to begin compressing the spring 114 and urging the conical part 110 of the valve upwardly into the bore or passage 90 to diminish the amount of air which may pass through the flow control means. As the difference between the pressure in the manifold and in the crankcase increases the spring is further compressed by the force of the air flow until a second prescribed pressure differential, of for example, twelve inches of mercury, is obtained at which time the cone 110 is engaged with the seat 112 to close off entirely the air flow space between the valve and its seat. Air flow will then be permitted only through the passage 120 of the internal valve.

The aforementioned crankcase ventilation control means adapted to operate as described is desirable for the reason that at high differences of pressure between the manifold and the atmospheric condition within the crankcase the induction pull or suction of the manifold will be very great, and if the breather conduit 50 were unrestricted there would be so much air drawn into the manifold as to dilute the combustible mixture received from the carburetor and thereby diminish the effectiveness of the combustible charge. However, when the difference in pressure between that of the manifold and the crankcase is low the pull or suction of the manifold vacuum is not very great and it is preferable not to restrict the breather tube 50 in order to allow a sufficient quantity of air to pass therethrough to allow for adequate crankcase ventilation.

When the difference in pressure between that within the intake manifold and within the crankcase reaches a third prescribed limit, of say twenty to twenty-one inches of mercury, the biasing force of the spring member 98 holding the external valve 78 upon the external valve seat 92, is overcome. The external valve is then raised from its seat sufficiently to allow crankcase air to flow around the outside of the external valve through the fluted or grooved passages 101. The crankcase air flows on through the upper portion of passage 74 and into the intake manifold chamber 58 to lower the manifold pressure. The extent of lift applied to valve 78 will be such as will prevent the intake manifold vacuum from exceeding the prescribed limit.

The disposition of the crankcase ventilating valve 102 within the manifold vacuum control valve 78 enables proper control of crankcase ventilation without a dilution of the combustible charge while making available the forces acting to close the crankcase ventilation control valve 102 in assisting to lift the manifold vacuum control valve 78. The pressure differential necessary to overcome the biasing force of spring 98 upon the manifold vacuum control valve 78 is adapted to be such as exists only during an engine overrun condition when the engine is operating at high speed and the throttle valve is closed. The external valve 78, therefore, is open only at a time when there is no combustible charge being fed to the engine and is adapted to remain closed during engine idling and driving conditions.

The lowering of the manifold vacuum during the engine overrun condition by admitting crankcase ventilation air to the intake manifold prevents the manifold depression from exceeding limits which would otherwise draw lubricating oils through valve passages, about piston rings, etc., and eventually into the combustion space where they would be burned-up and carried away through the exhaust system of the engine. The manifold vacuum control means thus provides the desirable feature of reducing oil consumption within any engine within which it is installed.

I claim:

1. A fluid flow control means for regulating fluid flow through a conduit and including means for providing proportionate flow restriction within prescribed limits and relief thereafter dependent upon fluid flow pressure, said control means including a housing having valve means disposed therein, calibrated means for holding one of said valve means normally open and another of said valve means normally closed, said first-mentioned calibrated means being overcome proportionately to said fluid flow pressure until said one valve means is closed, and said second-mentioned valve means being overcome proportionately to said fluid flow pressure thereafter for opening said other valve means.

2. Fluid flow control means for regulating fluid flow through a conduit and including means for providing controlled flow restriction and relief dependent upon fluid flow pressures, said control means including a housing adapted to be secured within a fluid flow conduit, valve means mounted within said housing, calibrated means connected to said valve means for normally disposing one of said valve means in an open position and another of said valve means in a closed position, said calibrated means connected to said one valve means being first overcome to allow said one valve means to be closed by fluid flow pressure, and said calibrated means connected to said other valve means being thereafter overcome to allow said other valve means to be opened by fluid flow pressure.

3. Crankcase ventilating control means including a valve housing adapted to be disposed within a conduit connected between an engine crankcase and intake manifold, a check valve disposed within said valve housing and including calibrated biasing means for holding said check valve in an open position and for restraint proportionate to fluid flow pressure therethrough, a relief valve mounted within said valve housing and having said check valve mounted therewithin, and calibrated means for biasing said relief valve closed, said last-mentioned calibrated biasing means being overcome subsequent to said first-mentioned biasing means to provide fluid flow relief following controlled fluid flow restraint.

4. Crankcase ventilating control means including a valve housing adapted to be disposed within a conduit connected between an engine crankcase and intake manifold, check valve means concentrically disposed within said housing, one of said check valve means including calibrated means for biasing said one check valve means open, and the other of said check valve means including calibrated means for biasing said other check valve means closed, said first-mentioned calibrated means being first overcome by fluid pressure to close said one valve means to restrict fluid flow therethrough, and said last-mentioned valve means being thereafter overcome by fluid pressure to open said other check valve means to permit greater fluid flow.

5. In combination with crankcase ventilating control means adapted to be disposed within a conduit connected between an engine crankcase and intake manifold and including a valve housing, a fluid flow check valve disposed within said housing and means for biasing said check valve open, said means being overcome by fluid flow pressure to close said valve and restrict fluid flow therethrough; a manifold vacuum relief valve concentrically arranged with respect to said check valve within said valve housing and means for biasing said relief valve closed, said relief valve biasing means being adapted to be overcome by fluid flow pressure subsequent to the closing of said check valve for permitting fluid flow and relieving manifold vacuum within said intake manifold.

6. In combination with crankcase ventilating control means adapted to be disposed within a fluid flow conduit connected between an engine crankcase and intake manifold and including check valve means normally biased open and adapted to be closed by fluid flow pressure to restrict fluid flow between said crankcase and said intake manifold; a manifold vacuum relief valve concentrically disposed about said check valve and within said valve housing, calibrated means for biasing said relief valve closed, said calibrated means being overcome by fluid flow pressure acting to close said check valve and to open said relief valve subsequent to the closing of said check valve for relieving manifold vacuum pressure within said intake manifold.

7. Crankcase ventilating control means and manifold vacuum relief means in combination including, a valve housing adapted to be disposed within a fluid flow conduit connected between an engine crankcase and intake manifold, a manifold pressure relief valve disposed within said housing, calibrated means for biasing said relief valve closed, a crankcase ventilating check valve concentrically disposed within said relief valve, and calibrated means for biasing said check valve open, said last-mentioned biasing means being overcome by fluid flow pressure to close said check valve and restrict fluid flow, and said first-mentioned biasing means being subsequently overcome to open said relief valve and permit fluid flow to said intake manifold for reducing manifold vacuum pressure therein.

8. Crankcase ventilating and manifold vacuum relief control means in combination including a valve housing adapted to be disposed within a fluid flow conduit connected between an engine crankcase and intake manifold, said control means comprising a pair of check valves disposed within said housing in the path of air flow therethrough and having biasing means engaged therewith, said biasing means urging one of said valves to an open position and the other of said valves to a closed position, one of said biasing means being stronger than the other of said biasing means, the weaker of said biasing means being engaged with said one valve and being insufficiently strong to overcome a manifold suction of approximately three inches of mercury and being overcome by the movement of said one valve to a closed position by the air flow when manifold suction is greater than approximately three inches to decrease the size of the flow passage in said conduit, the stronger of said biasing means being engaged with said other valve and being insufficiently strong to overcome a manifold suction of approximately twenty inches of mercury and being compressed by movement of said other valve to an open position by air flow when manifold suction is greater than approximately twenty inches, and the opening of said other valve relieving the restriction to fluid flow through said conduit imposed by said one valve and reducing the vacuum pressure within said intake manifold.

No references cited.